Aug. 14, 1956     D. K. BEAVON     2,758,978
REGENERATION OF CRACKING CATALYSTS
Filed Oct. 7, 1952
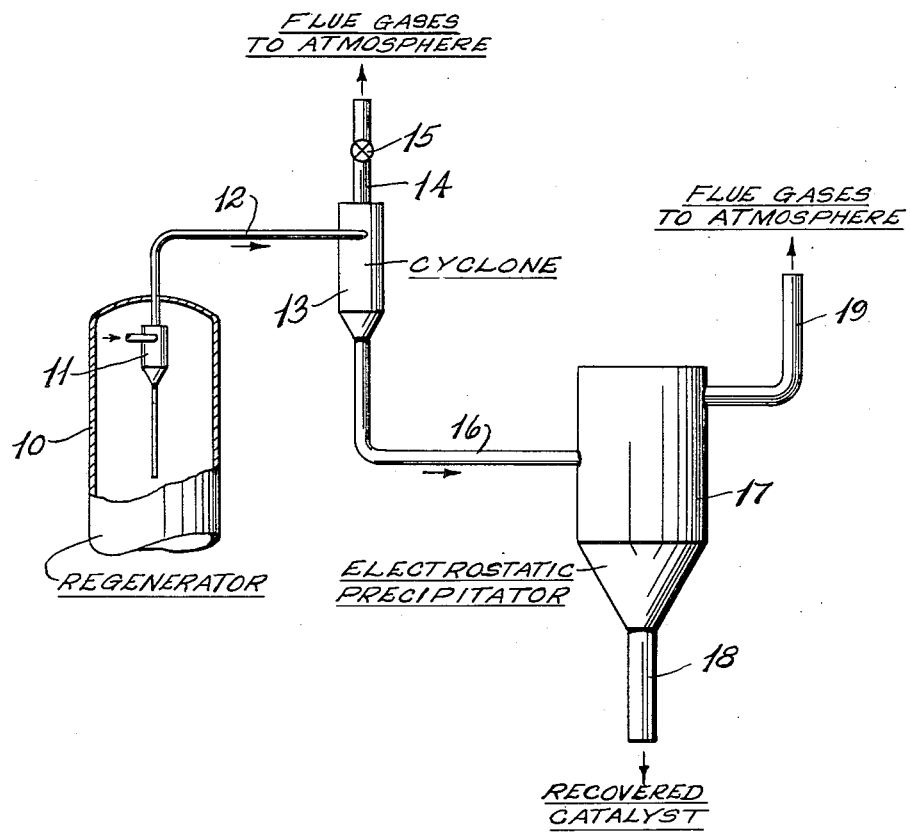
INVENTOR.
DAVID K. BEAVON
BY
ATTORNEY — # United States Patent Office 2,758,978
Patented Aug. 14, 1956

2,758,978

REGENERATION OF CRACKING CATALYSTS

David K. Beavon, Los Angeles, Calif., assignor to The Texas Company, New York, N. Y., a corporation of Delaware Application October 7, 1952, Serial No. 313,409

2 Claims. (Cl. 252—417)

This invention relates to certain improvements relating to the regeneration of catalysts used in the conversion of hydrocarbon oils and is particularly concerned with improvements in handling the gaseous effluent from the regenerator so as to remove from the gases any contained catalyst.

In the conversion of hydrocarbon oil in contact with solid particle catalyst carbonaceous deposits are formed on the catalyst and the catalyst is reactivated by burning. It is common to regenerate the catalyst by fluidizing it in a gaseous stream containing oxygen and subjecting the catalyst to combustion under fluidized conditions. In such operations the great bulk of the catalyst is separated from the gases in the regenerator. However, the effluent gases do contain some catalyst fines and these gases are commonly passed through a plurality of cyclones and finally to an electrostatic precipitator in the effort to remove the last trace of fines from the gases which are discharged to the atmosphere. In each cyclone separator the entire gas stream is removed over-head and the catalyst accumulating at the bottom is withdrawn as a compact mass.

In accordance with the present invention the cyclone separation is modified so as to withdraw a portion of the gas with the catalyst from the bottom of the cyclone. It is found that by withdrawing a certain amount of gas with the catalyst from the bottom of the cyclone the efficiency thereof is greatly increased. In other words, the catalyst content of the over-head gas stream is so greatly reduced that it is not necessary to pass this gas stream through an electrostatic precipitator. The bottom stream of gas and catalyst is conducted to an electrostatic precipitator wherein the catalyst and gas are separated.

In the cyclone separation a high gas velocity is desirable in order to obtain efficient separation between the gas and solid material, but this high velocity is not suited for the electrostatic precipitator. Thus, in accordance with the invention, by reducing the quantity of gas passing through the electrostatic precipitator, the efficiency of the precipitator is greatly improved and the over-all efficiency of the combined cyclone and precipitator is increased.

The invention will be clearly understood by reference to the accompanying drawing which is a diagrammatic elevation illustrating a preferred embodiment of the invention.

Referring to the drawing, the numeral 10 indicates the regenerator in which the solid particle catalyst is subjected to regeneration under fluidized conditions. The great bulk of the catalyst is separated from the gases and withdrawn at the bottom in a well-known manner. The gases in the upper part of the chamber containing some fines pass through an internal cyclone 11, thence through line 12 to an external cyclone 13.

In the cyclone 13 catalyst particles separated descend to the bottom of the cyclone and an over-head gas stream is withdrawn through a line 14. A valve 15 in the line 14 restricts the flow of gas so that a minor portion thereof is forced to find exit with the catalyst through line 16 from the bottom of the cyclone. By withdrawing this minor portion of gas with the catalyst from the bottom of the cyclone the separating efficiency of the cyclone is so increased that the over-head gas stream flowing through line 14 will contain considerably less catalyst than if all the gas were passed through line 14 in the regular way. Consequently the gas stream flowing through line 14 normally can be vented to the atmosphere without harm.

The stream of gas and catalyst flowing in line 16 is directed to an electrostatic precipitator 17, such, for example, as a Cottrell precipitator, wherein the catalyst particles are precipitated and the catalyst is withdrawn through line 18 while the gas freed of catalyst is discharged through line 19 to the atmosphere.

The amount of gas to be withdrawn from the bottom of the cyclone in order to obtain a satisfactory increase in efficiency of the cyclone is about 10–20% of the quantity of gas entering the cyclone; generally proportions around the lower figure give the maximum efficiency. The valve 15 is controlled so as to maintain this desired quantity of gas flowing with the catalyst through the bottom outlet. It will be seen that by reducing the quantity of gas flowing to the precipitator the latter is required to handle only a small portion of the gaseous effluent from the regenerator and that the velocity of the gas flowing through the precipitator is greatly reduced.

In a typical operation in accordance with the invention the gas stream entered the cyclone 13 at a temperature of 1000° F. under about 4 lbs. per sq. in. gauge pressure and contained approximately 12 to 18 grains of catalyst dust per standard cubic foot (dry basis). The gas stream was at a high velocity estimated at 900 feet per second at the entrance to the cyclone. All the catalyst particles coarser than 10 microns diameter were withdrawn through the bottom outlet together with over 90% of the material finer than 10 microns, giving the cyclone an overall efficiency of about 95–98%. The catalyst content of the gases flowing to the atmosphere through both lines 14 and 19 was so low that both streams could be discharged to the atmosphere without any undue harm.

Although the gas stream from the cyclone 13 normally contains such a low content of catalyst, typically 0.4 grain or less per sq. ft. of gas, as to be capable of venting to the atmosphere without any undue harm, in case it is desired to remove even this slight amount of catalyst from the gas stream it may readily be accomplished by washing the gases with water.

Obviously many modifications and variations of the invention, as hereinbefore set forth, may be made without departing from the spirit and scope thereof, and therefore only such limitations should be imposed as are indicated in the appended claims.

I claim:

1. In the regeneration of solid particle catalyst used in the conversion of hydrocarbons with resultant deposition of carbonaceous material thereon wherein the catalyst is regenerated by burning under fluidized conditions, the process that comprises subjecting the regenerator gaseous effluent containing catalyst fines to cyclonic separation to form an overhead gaseous stream substantially free of entrained catalyst fines and constituting of the order of 80 to 90% of said gaseous effluent and a bottom gaseous stream containing the separated catalyst and constituting of the order of 10 to 20% of said gaseous effluent, discharging said overhead gaseous stream to the atmosphere, conducting the bottom stream to a precipitator and subjecting it therein to electrostatic precipitation and separately withdrawing the separated catalyst and gases from the precipitator.

2. In the regeneration of solid particle catalyst used in the conversion of hydrocarbons with resultant deposition of carbonaceous material thereon wherein the catalyst is regenerated by burning under fluidized conditions, the process that comprises passing effluent gases from the regenerator containing catalyst fines to a cyclone separator, withdrawing an overhead gaseous stream substantially free of entrained catalyst fines from the cyclone separator to the atmosphere, withdrawing from the bottom of the cyclone separator a gaseous stream containing the separated catalyst, restricting the outflow of the overhead gaseous stream so that of the order of 10 to 20% of said effluent gases are withdrawn in the bottom stream, conducting the bottom stream to a precipitator and subjecting it therein to electrostatic precipitation and separately withdrawing the separated catalyst and gases from the precipitator.

References Cited in the file of this patent

UNITED STATES PATENTS

| | | |
|---|---|---|
| 1,928,702 | O'Mara | Oct. 3, 1933 |
| 2,615,785 | Jewell | Oct. 28, 1952 |

FOREIGN PATENTS

| | | |
|---|---|---|
| 866,898 | Germany | July 8, 1949 |